(12) United States Patent
Higdon (10) Patent No.: US 11,602,145 B1
(45) Date of Patent: Mar. 14, 2023

(54) WATERFOWL MOTION DECOY

(71) Applicant: John Mark Higdon, Paducah, KY (US)

(72) Inventor: John Mark Higdon, Paducah, KY (US)

( * ) Notice: Subject to any disclaimer, the term of this patent is extended or adjusted under 35 U.S.C. 154(b) by 0 days.

(21) Appl. No.: 17/576,846

(22) Filed: Jan. 14, 2022

Related U.S. Application Data

(60) Provisional application No. 63/134,218, filed on Jan. 6, 2021.

(51) Int. Cl.
*A01M 31/06* (2006.01)

(52) U.S. Cl.
CPC ......... *A01M 31/06* (2013.01); *A01M 2200/00* (2013.01)

(58) Field of Classification Search
CPC .................................................. A01M 31/06
USPC .......................... 43/3, 2; 446/153, 154, 156
See application file for complete search history.

(56) References Cited

U.S. PATENT DOCUMENTS

| 217,483 | A | * | 7/1879 | Redmond | A01M 31/06 43/3 |
| 717,790 | A | * | 1/1903 | Yorke | A01M 31/06 446/156 |
| 811,036 | A | * | 1/1906 | Cram | A01M 31/06 43/3 |
| 1,392,065 | A | * | 9/1921 | Klock | A01M 31/06 43/3 |
| 1,468,979 | A | * | 9/1923 | Sherman | A01M 31/06 43/3 |
| 2,434,335 | A | * | 1/1948 | Signalness | A01M 31/06 43/3 |
| 2,457,295 | A | * | 12/1948 | Woodhead | A01M 31/06 43/3 |
| 2,591,554 | A | * | 4/1952 | Kinney | A01M 31/06 43/26.1 |
| 2,814,898 | A | * | 12/1957 | Fluke | A01M 31/06 43/42.22 |

(Continued)

FOREIGN PATENT DOCUMENTS

CA 2391478 A1 * 12/2003 ............ A01M 31/06

OTHER PUBLICATIONS

Mudmotortalk.com; http://mudmotortalk.com/mmt_v2/viewtopic.php?f=8&t=6269; Sep. 23, 2021; pp. 1-11.

(Continued)

*Primary Examiner* — Darren W Ark
(74) *Attorney, Agent, or Firm* — C. Brandon Browning; Maynard, Cooper & Gale, PC (57) ABSTRACT

The present disclosure is directed to motion waterfowl decoys and methods of attracting waterfowl using same. The waterfowl decoy mimics the feeding behavior of live waterfowl by moving its head toward a surface without the remainder of their body moving in the same motion. The feeding motion is provided by rotating a spherical ball breast of the decoy, to which the head is attached. When the ball breast rotates, the head moves toward the surface while the body remains in its initial position. Rotation is provided using manually-provided pressure or a battery-driven device, such as a bilge pump or a gear motor. When rotation of the ball breast ceases to be provided, a counterweight in the ball breast returns to its initial position, moving the ball breast and head back to an upright position.

18 Claims, 9 Drawing Sheets

(56) References Cited

U.S. PATENT DOCUMENTS

| | | | | |
|---|---|---|---|---|
| 3,079,719 | A * | 3/1963 | Muszynski | A01M 31/06 43/3 |
| 3,434,234 | A * | 3/1969 | Schleter | A63H 23/10 446/158 |
| 3,927,485 | A * | 12/1975 | Thorsnes, Jr. | A01M 31/06 43/3 |
| 4,965,953 | A * | 10/1990 | McKinney | A01M 31/06 43/2 |
| 5,274,942 | A * | 1/1994 | Lanius | A01M 31/06 43/2 |
| 5,279,063 | A * | 1/1994 | Heiges | A01M 31/06 43/3 |
| 5,375,363 | A * | 12/1994 | Higdon | A01M 31/06 43/3 |
| 6,088,944 | A * | 7/2000 | Jones | A01M 31/06 446/155 |
| 6,412,209 | B1 * | 7/2002 | Kapraly | A01M 31/06 43/3 |
| 6,412,210 | B1 * | 7/2002 | Horrell | A01M 31/06 446/155 |
| 6,560,912 | B1 * | 5/2003 | Achepohl | A01M 31/06 43/3 |
| 6,601,333 | B2 | 8/2003 | Cicoff et al. | |
| 6,643,971 | B2 * | 11/2003 | Daniels | A01M 31/06 43/3 |
| 7,841,123 | B2 * | 11/2010 | Walker | A01M 31/06 43/2 |
| 8,919,028 | B2 * | 12/2014 | Young | A01M 31/06 43/3 |
| 8,925,240 | B2 * | 1/2015 | Beal | A01M 31/06 43/2 |
| 8,997,394 | B2 * | 4/2015 | Baskfield | A01M 31/06 43/3 |
| 9,386,765 | B1 * | 7/2016 | Chatelain | A01M 31/06 |
| 9,700,036 | B1 * | 7/2017 | Chatelain | A01M 31/00 |
| 9,756,847 | B1 * | 9/2017 | Williams | F16H 57/02 |
| 9,924,711 | B1 * | 3/2018 | Gill, II | A01M 31/06 |
| 10,517,290 | B2 * | 12/2019 | Young | A01M 31/06 |
| 11,083,189 | B1 * | 8/2021 | Baskfield | A01M 31/06 |
| 2002/0157299 | A1 * | 10/2002 | Barrett | A01M 31/06 43/3 |
| 2002/0178639 | A1 * | 12/2002 | Daniels | A01M 31/06 43/3 |
| 2003/0101636 | A1 * | 6/2003 | Pippert | A01M 31/06 43/3 |
| 2004/0010957 | A1 * | 1/2004 | Corbiere, Jr. | A01M 31/06 43/3 |
| 2006/0053675 | A1 * | 3/2006 | Lindaman | A01M 31/06 43/2 |
| 2006/0080884 | A1 * | 4/2006 | Heinn | A01M 31/06 43/2 |
| 2006/0207158 | A1 * | 9/2006 | Brewer | A01M 31/06 43/3 |
| 2008/0155879 | A1 * | 7/2008 | Whipple | A01M 31/06 43/3 |
| 2008/0295381 | A1 * | 12/2008 | Barr | A01M 31/06 43/2 |
| 2010/0064569 | A1 * | 3/2010 | Wyant | A01M 31/06 43/2 |
| 2010/0175300 | A1 * | 7/2010 | Lau | A01M 31/06 43/2 |
| 2010/0175302 | A1 * | 7/2010 | Allen | A01M 31/06 43/3 |
| 2011/0146132 | A1 * | 6/2011 | Young | A01M 31/06 43/3 |
| 2011/0232153 | A1 * | 9/2011 | Jennings, Jr. | A01M 31/06 43/2 |
| 2012/0090217 | A1 * | 4/2012 | Young | A01M 31/06 43/3 |
| 2013/0014422 | A1 * | 1/2013 | Bullerdick | A01M 31/06 43/3 |
| 2013/0291422 | A1 * | 11/2013 | Beal | A01M 31/06 43/2 |
| 2014/0259860 | A1 * | 9/2014 | Baskfield | A01M 31/06 43/3 |
| 2014/0298706 | A1 * | 10/2014 | Turner | A01M 31/06 43/2 |
| 2015/0173347 | A1 * | 6/2015 | Lawton, Jr. | A01M 31/06 43/3 |
| 2016/0143265 | A1 * | 5/2016 | Bourlet | A01M 31/06 43/3 |
| 2016/0242409 | A1 * | 8/2016 | Beauchamp | A01M 31/06 |
| 2017/0049095 | A1 * | 2/2017 | Hanson | A01M 31/06 |
| 2017/0099831 | A1 * | 4/2017 | Bullerdick | A01M 99/00 |
| 2017/0164604 | A1 * | 6/2017 | Shea | A01M 31/06 |
| 2021/0186003 | A1 * | 6/2021 | Denmon | A01M 31/06 |
| 2021/0244014 | A1 * | 8/2021 | Furness | A01M 31/06 |

OTHER PUBLICATIONS

Boogymanoutdoors; DIY Bilge Pump Motion Decoy; https://www.pinterest.com/pin/463800461597656004/; Sep. 23, 2021; p. 1.

Colorado Outdoors Online; Duck Decoy Basics, https://coloradooutdoorsmag.com/2018/12/27/duck-decoy-basics; Sep. 23, 2021; pp. 1-10.

* cited by examiner

WATERFOWL MOTION DECOY

RELATED APPLICATIONS

This application claims priority to U.S. Provisional Patent Application No. 63/134,218 filed on Jan. 6, 2021, titled "Feeder Motion Waterfowl Decoys", the entire contents of which are incorporated herein.

TECHNICAL FIELD

The present invention is directed to motion waterfowl decoys that mimic the motions of waterfowl, attracting waterfowl to its vicinity.

BACKGROUND OF INVENTION

Waterfowl decoys are used to attract live waterfowl or other animals to a desired region for hunting or observation. Waterfowl decoys are provided appearances similar to waterfowl, such as similar coloring, shapes, and sizes. Further, some waterfowl decoys are designed to mimic normal waterfowl behaviors, such as by floating, feeding, flapping wings, or other waterfowl movements. The placement of waterfowl decoys may be on a solid surface, such as the ground, or on a surface of a body of water. Regardless of environment, a successful decoy encourages live waterfowl to inhabit nearby space by providing cues that the area is safe and secure. Feeding motions indicate a source of food is available, which may encourage nearby waterfowl to attempt to feed. Further, simply the presence of a realistic motion decoy may provide a sense of security to observing waterfowl, persuading them to land and remain in the vicinity of the decoy.

SUMMARY OF THE INVENTION

The present invention is directed to a motion waterfowl decoy. In one aspect of the invention, there is provided a motion waterfowl decoy. The decoy includes a body comprising a buoyant material for floating on a surface and having a hollowed chest region fitted with a substantially spherical ball breast. The ball breast is attached to a head of the decoy and configured to rotate about a horizontal pivot point through center of decoy breast and center of the ball breast. The decoy further includes a tether having a first end attached to an exterior attachment point of the ball breast and a second end configured to be pulled by a user. The tether extends from the ball breast, through a bottom weight, and to the user. A breast counterweight is located within the ball breast and configured to leave a resting position and rotate when the ball breast rotates. When the user pulls the tether, the ball breast rotates until the breast counterweight reaches the back and the neck base of the decoy, such that the head rotates forward toward the surface without a posterior region of the body rotating forward. When the user releases pressure on the tether, the breast counterweight moves back down towards its resting position, rotating the ball breast such that the head rotates up away from the surface. As such, the head simulates the natural movement of a feeding duck.

In some instances, the buoyant material is foam and the ball breast is plastic filled with foam. In some instances, when the user pulls the tether after the breast counterweight reaches the back neck base of the decoy, the head rotates below the surface and a posterior region rotates away from the surface. The posterior region of the body is larger and more buoyant than the ball breast in some instances.

In some embodiments, the decoy further includes an extended counterweight extending vertically beneath a lower portion of the decoy, the extended counterweight configured to remain in a vertical orientation and stabilize the body. The head configured to pivot on the extended counterweight is configured to pivot below the remaining body, and a counterweight pivot point for the extended counterweight is located at approximately an inch to the rear of the center point of the body. In some embodiments, the head further includes at least one passage configured to collect liquid when the head is submerged below the surface and drain liquid when the head is above the surface. In some instances, the decoy further includes at least one main drainage passage extending from a head base to a lower region of the ball breast, such that liquid collected at the head base is configured to drain through the main drainage passage. Alignment of the main drainage passage with one or more passages at the head base alters flow rate of draining liquid. Slower drainage results in the head moving away from the surface more slowly than faster drainage.

In another aspect of the invention, there is provided a battery-powered waterfowl decoy. The decoy includes a body comprising a buoyant material for floating on a surface and a hollowed chest region fitted with a substantially spherical ball breast. The head is attached to the ball breast of the decoy and configured to rotate about a horizontal breast pivot point through a center of the ball breast. The decoy also includes a breast counterweight located within the ball breast and configured to leave a resting position and rotate when the ball breast rotates. A battery is located within the body and configured to power a battery-operable driving device that is coupled to the ball breast by a tether. When the battery powers the battery-operable driving device, the battery-operable driving device pulls the tether and the ball breast rotates until the breast counterweight reaches a neck back base of the decoy, such that the head rotates forward toward the surface without a posterior region of the body rotating forward. When the battery ceases powering the battery-operable driving device, the breast counterweight moves back down towards its resting position, rotating the ball breast such that the head rotates away from the surface and back to the looking position.

In some embodiments, the battery-operable driving device is a bilge pump. In some instances, the bilge pump includes a piston attached to the tether and a hole through which the tether extends from the piston to the ball breast. The battery is configured to provide power to the bilge pump, such that the piston is pushed outward, the tether is pulled, and the ball breast rotates the head toward the surface. In some embodiments, the battery-operable driving device is a motor. In some instances, the tether is attached to the motor at a first end and to the ball breast at a second end. The battery is configured to provide power to the motor, such that the tether is pulled and the ball breast rotates the head toward the surface. In some embodiments, the battery further includes a timer configured to instruct battery to periodically provide power to the battery-operable driving device. In some instances, the battery and the timer are housed in a waterproof housing within the body of the decoy.

A further understanding of the nature and advantages of the present invention will be realized by reference to the remaining portions of the specification and the drawings.

BRIEF DESCRIPTION OF DRAWINGS

The present disclosure same can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

Figure 4:
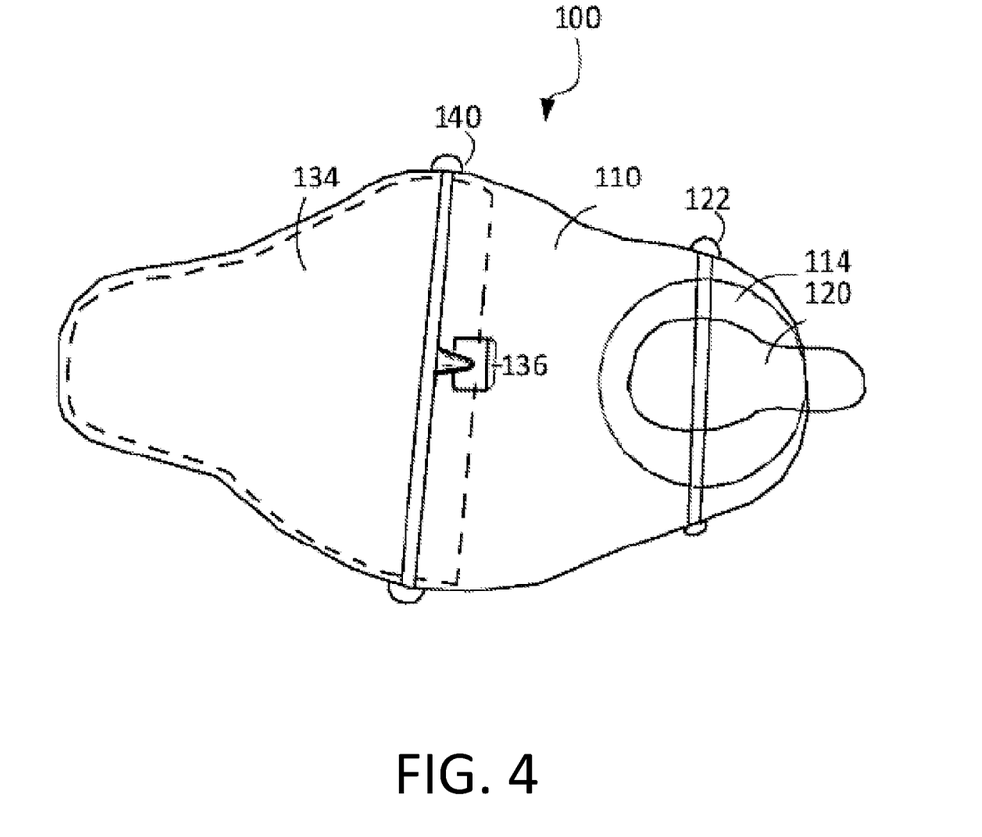
FIG. 4 depicts a top view of the motion waterfowl decoy of FIG. 1, with a counterweight providing stability to the decoy body.
Figure 5:
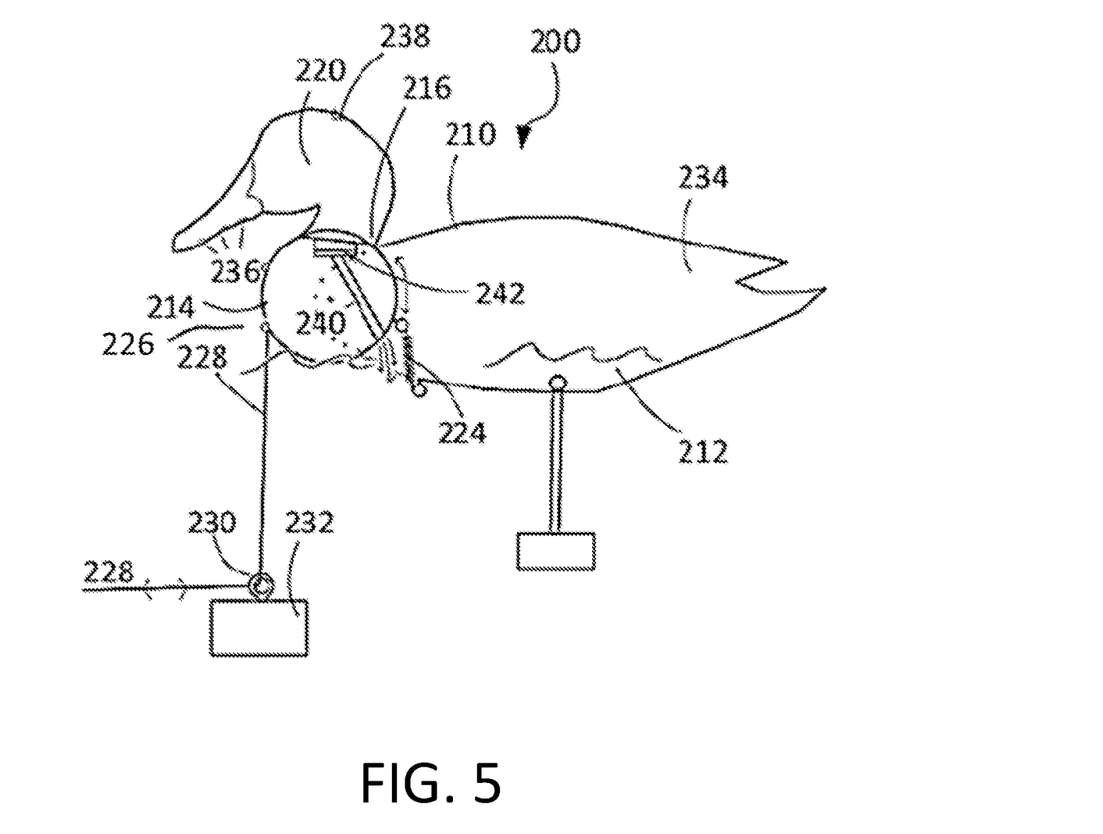
FIG. 5 depicts a side view of an embodiment of the waterfowl decoy of FIG. 1 with a draining passage for water to exit the decoy head when the decoy is in an upright position.

The present invention is generally directed to motion waterfowl decoys and methods of attracting waterfowl using same. In FIGS. 1 through 4, a waterfowl decoy 100 is presented, in which decoy motion is accomplished manually by a user applying pressure to a rotating breast section of the decoy. In FIG. 4, an embodiment of a waterfowl decoy 200 is presented in which water drains through a passage in the head of decoy 200. In FIG. 5, an embodiment of a waterfowl decoy 200 is presented in which motion is imparted by wind. In FIGS. 6 through 9, a battery-powered waterfowl decoy is presented, in which feeding motions are carried out in a battery-operated bilge pump embodiment 300 or battery-operated motor embodiment 400, respectively. Motions of the waterfowl decoy mimic feeding behavior of live waterfowl and encourage observing waterfowl to remain in the environment of the decoy.

Figure 1:
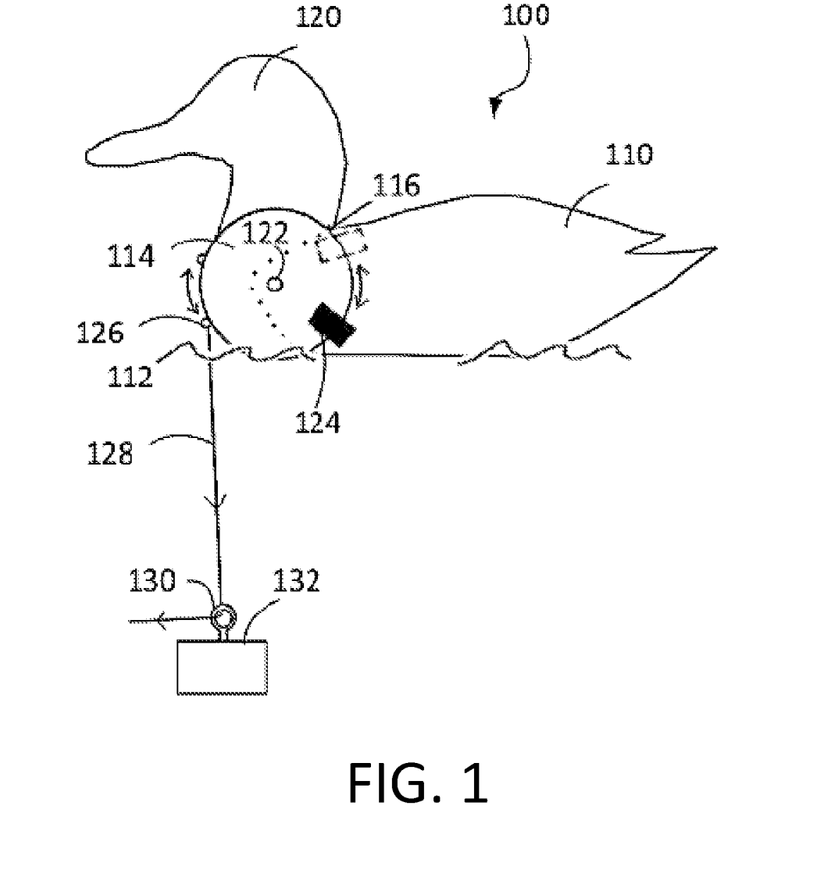
FIG. 1 is a side view of a motion waterfowl decoy of the present disclosure, where motion is accomplished by a user applying pressure to a rotating ball breast structure.

Referring to FIG. 1, waterfowl decoy 100 is presented, where feeding motion is provided manually by a user. Decoy 100 is provided with a body 110 shaped and colored to imitate a bird is selected from the group consisting of a waterfowl, a duck, a mallard, a hen, a drake, a dabbling duck, a pintail duck, a goose, a black duck, a canvasback duck, or a widgeon duck. In some embodiments, body 110 is formed using a foam or other buoyant material. Exemplary buoyant materials include polyurethane, ethyl vinyl acetate (EVA) foam, foam rubber, closed-cell foams, or combinations thereof. In some embodiments, body 110 includes an outer shell that imitates a waterfowl appearance and an interior cavity filled with a foam or other buoyant material. Body 110 is unsinkable in some instances, such as when formed using a mixture of silicone rubber and spherical EVA foam.

Feeding motion of waterfowl decoy 100 is undertaken when waterfowl decoy 100 on a surface 112, such as grass, dirt, sand, gravel, or manmade surfaces, such as concrete. Surface 112 may also include the surface of a body of water, where the body of water is, for example, a pond, lake, river, flooded field, creek, stream, bay, harbor, or other location where targeted waterfowl are present or are expected to be present. When surface 112 is a solid surface, waterfowl decoy 100 is configured to be operated on a stake or stand. When surface 112 is a surface of a body of water, waterfowl decoy 100 is configured to float on the surface of the body of water. Feeding motion or other motions are configured to position waterfowl decoy 100 on or partially below surface 112 to mimic the movements of live waterfowl. Specifically, head and neck regions of waterfowl decoy 100 are configured to pivot about the breast when moving its head from an upright position to a feeding position. The head or neck region first moves toward surface 112 before body 110 moves below surface 112. An initial feeding position is thus established when only head and neck regions of waterfowl decoy 110 move substantially toward surface 112, while a secondary feeding position is established when the remainder of body 110 follows through the motion of the head and neck and positions at least a portion of body 110 below a plane of surface 112. Unlike some prior art decoys, the head and neck do no rotate in a single direction or 360° or more. Feeding positions are discussed in greater detail below.

To provide accurate motions to mimic waterfowl feeding behavior, waterfowl decoy 110 is designed to have head and neck movement separate from movement of the entire body 110. In FIG. 1, a ball breast 114 is used to impart head and neck pivoting motion. Ball breast 114 is formed in a breast region of body 110 and is buoyant. Ball breast 114 replaces approximately a front half of body 110 below the head and neck of waterfowl decoy 100. For instance, a cavity is formed in body 110 at the neck base 116 and extends into the chest of body 110. Ball breast 114 is positioned and affixed within the cavity with little gap between ball breast 114 and body 110. In some instances, ball breast 114 is formed from plastic and filled with foam.

Figure 2:
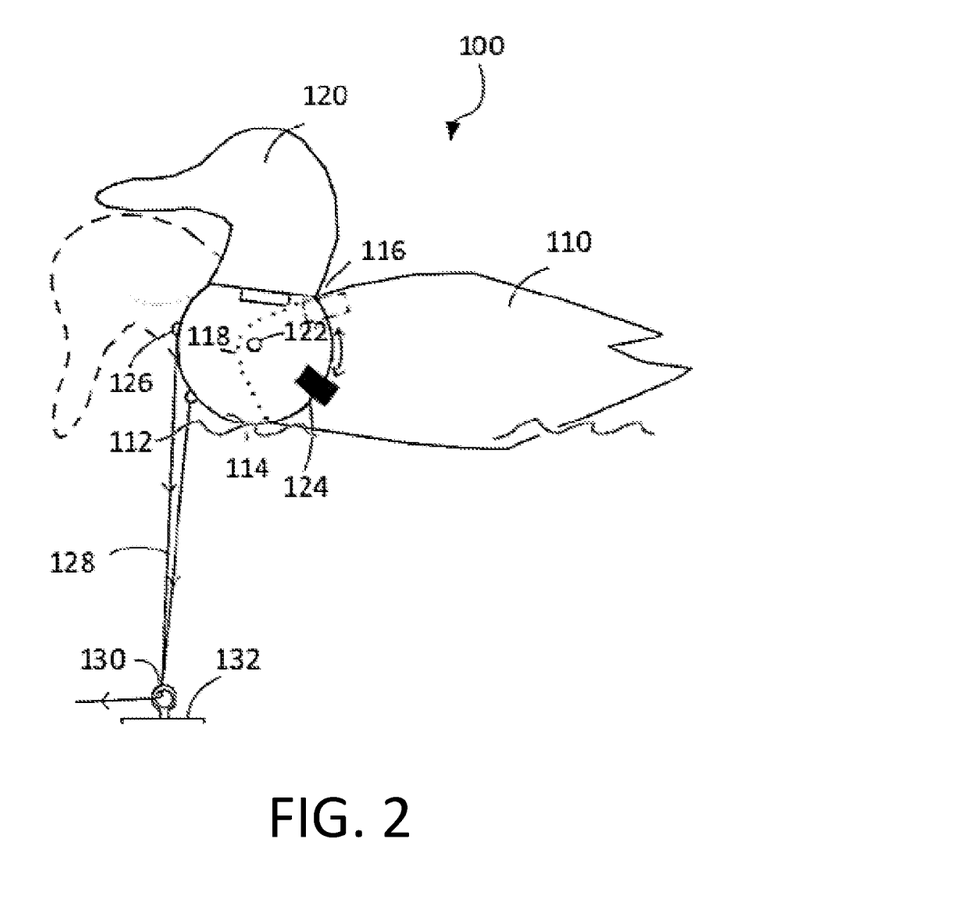
FIG. 2 depicts a side view of the waterfowl decoy of FIG. 1, where the decoy feeding motion is represented by the waterfowl head leaving an upright position (solid head lines) for an initial feeding position (dashed head lines) upon application of pressure to the rotating ball breast by a user.

FIG. 2 shows a cutout path 118 with a dotted line, where material of body 110 is removed for the placement of ball breast 114. Path 118 is shown with the dotted line, but may form other shapes or have a different extension into body 110 in embodiments not depicted. Different shapes and sizes of path 118 are compatible with the present disclosure. Removal of body material may be performed using methods known to those skilled in the art, or body 110 may be formed with a cavity for ball breast 114 present upon manufacture. Ball breast 114 has the coloring and appearance typical of a waterfowl in some instances.

The head 120 is removably attached to and mounted on the ball breast 114 of waterfowl decoy 100, such that movement of ball breast 114 results in visible movement of head 120. Live animals have necks that are flexible, but waterfowl decoy 100 utilizes a static rigid neck and head for simplification of manufacturing. The rigidity of the neck and head is not detectable when moving according to the rotation of ball breast 114, especially from a distance. Waterfowl would typically see other waterfowl or decoys 100 briefly from a distance of at least several yards away. Thus, any neck rigidity apparent to a human user is not visible to a target animal, such as a waterfowl. Ball breast 114 has a horizontal pivot point 122 that is located in a mid-section of the breast of waterfowl body 110. Pivot point 122 extend through a center point of ball breast 114 and serves as a point of pivot or rotation of ball breast 114 and, consequently, head 120.

Ball breast 114 further includes a breast counterweight 124 located in a cutout cavity within ball breast 114. Breast counterweight 124 is depicted as a weighted box, however other shapes and sizes of breast counterweight 124 are compatible with the present disclosure. When ball breast 114 is rotated so that head 120 moves downward toward surface 112, breast counterweight 124 also rotates from its original, resting position. The resting position of breast counterweight 124 is such that head 120 is in an upright position shown in FIG. 1. However, when ball breast 114 is rotated and head 120 lowers, such as depicted in FIG. 2, breast counterweight 124 is moved from its resting position. However, when pressure is released, as described below, and ball breast 114 rotates to return head 120 to its upright position as breast counterweight 124 returns to its resting position. Thus, when no pressure is applied by a user, waterfowl decoy 100 is positioned in an upright position and breast counterweight 124 is in a resting position, which is shaded in FIG. 1. It is the return of breast counterweight 124 to its resting position in the absence of user-imparted pressure that returns waterfowl decoy 100 from an initial or secondary feeding position to an upright position.

Referring again to FIG. 1, an attachment point 126 is located on ball breast 114 and configured to connect a string 128 or other tethering material to ball breast 114. Attachment point 126 is a loop in the depicted embodiment, though other means of attachment are compatible with the present disclosure. For instance, attachment point 126 may be a slot, eyelet, tab, hook, snap, button, magnet, or other attachment means. Attachment point 126 is located on a front, outward facing surface of ball breast 114 such that ball breast 114 is capable of rotating without being impeded by attachment point 126. In some instances, attachment point 126 is approximately 1-2 inches vertically below back and neck base 116, though other positions are compatible with the present disclosure. In some instances, attachment of string 128 to attachment point 126 is reversible, while in other instances attachment is permanent. String 128 is may be any tethering material, such as a line, rope, or wire. String 128 is configured to be directed through a loop 130 or other connection feature on a bottom weight 132. String 128 continues through loop 130 to a user who is capable of operating waterfowl decoy 100. Bottom weight 132 is depicted as a cube, but may be of any shape or size. When a user applies pressure by pulling string 128, ball breast 114 is rotated about horizontal pivot point 122 such that head 120 rotates forward toward surface 112, mimicking a feeding or drinking motion of a live waterfowl. Static decoys typically are not configured to have decoy head or neck motion separate from overall body motion. Thus, the present waterfowl decoy 100 is capable of more natural motion and may be a more convincing decoy to attract live target animals.

Referring to FIG. 2, when a user pulls string 128, waterfowl decoy 100 leaves its upright position, shown in solid lines, and assumes an initial feeding position, shown in dashed lines. String 128 is pulled through loop 130 of bottom weight 132, which does not move substantially. However, head 120 rotates forward toward surface 112. This rotation is limited by the movement of breast counterweight 124 to the upper back and neck base 116 of body 110. When breast counterweight 124 reaches the boundary of upper back and neck base 116, it does not continue to rotate, and therefore, head 120 ceases rotation as ball breast 114 halts. This position of breast counterweight 124 is shown in dashed lines.

Figure 3:
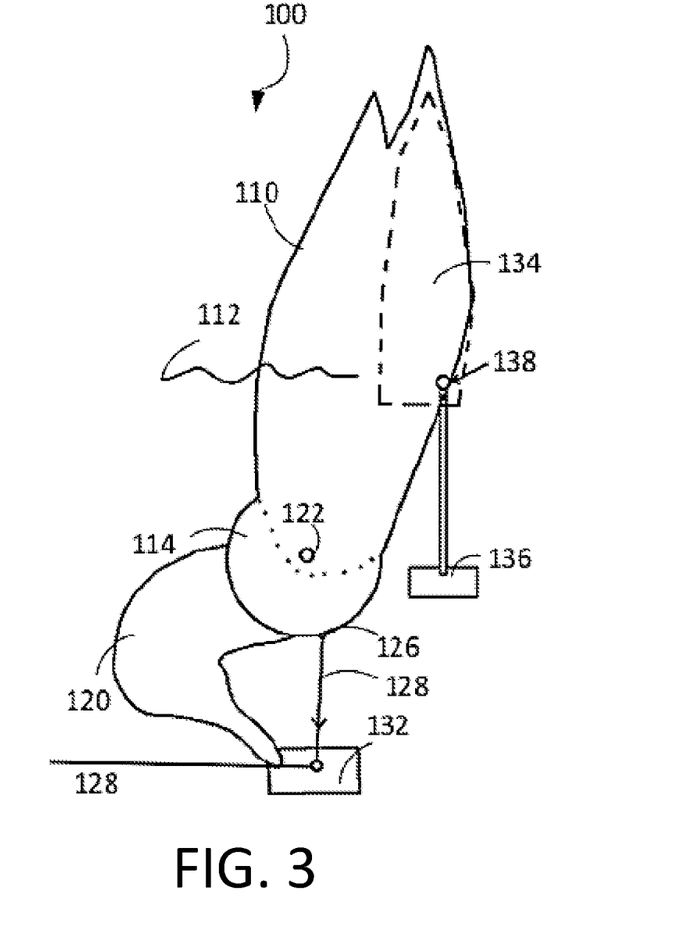
FIG. 3 depicts a side view of the waterfowl decoy of FIG. 1, where the decoy is positioned in a secondary feeding position with its head beneath the surface of a body of water.

In FIG. 3, when a user continues to apply pressure to string 128, ball breast 114 can no longer rotate past the point where breast counterweight 124 has reached upper neck base 116. Thus, continued pressure moves body 110 as a whole to a secondary feeding position, shown in FIG. 3. In this secondary feeding position, at least a portion of body 110 is moved below a plane of surface 112. When surface 112 is a surface of a body of water, at least a portion of body 110 is positioned underwater. The movement of body 110 includes head 120 and neck first moving below surface 112, mimicking a waterfowl feeding and diving below the surface of a body of water. This movement is possible, at least in part, because a posterior region 134 of body 110 is filled with foam or other buoyant material and is larger than ball breast 114, making it more buoyant than ball breast 114. Thus, ball breast 114 and the connected head 120 will become submerged before posterior region 134. In some embodiments, posterior region 134 remains mostly above a plane of surface 112.

To assume the secondary feeding position, body 110 pivots about a T-shaped extended counterweight 136, which hangs vertically below body 110. When ball breast 114 and the front of waterfowl decoy 100 is forced below surface 112, extended counterweight 136 remains in a vertical orientation and prevents waterfowl decoy 100 from tipping over from side to side or from flipping over onto its back. Extended counterweight 136 may be any shape or size capable of stabilizing waterfowl decoy without submerging body 110 when no pressure is applied. Extended counterweight 136 is shown attached to body 110 at approximately a lower body midpoint 138, and slightly to the rear, though other locations of attachment are compatible with the present disclosure.

FIG. 4 shows a top view of waterfowl decoy 100 in an upright position. Extended counterweight 136 is depicted extending below body 110 from a counterweight axis 140. When body 110 rotates from an initial feeding position to a secondary feeding position, rotation is about counterweight axis 140 such that head 120 rotates below surface 112 and posterior region 134 extends above surface 112. When pressure is released on string 128, extended counterweight 136 remains vertical such that posterior region 134 rotates downward toward surface 112 and head 120 rotates upwards toward surface 112. Thus, body 110 returns from the secondary feeding position to the initial feeding position. As pressure continues to be released on string 128 by the user, ball breast 114 rotates back to its counterweight resting position such that head 120 becomes upright. Thus, body 110 returns from the initial feeding position to the upright position.

The timing and motion of the head emerging last from the surface reflects natural movements of feeding waterfowl. Timing is controlled by an operator or user allowing head 120 or neck to fill with water in embodiments where such features are hollow and contain water entryways, as is described below in detail. The release or draining of water controls the speed in which head 120 returns to a resting position. Water draining is described in detail in a second embodiment of the disclosure, below. Further, all movement of waterfowl decoy 100 results in ripples of water when surface 112 is a surface of a body of water. These ripples are eye-catching to target animals and may aid in attracting the target animals to the vicinity of waterfowl decoy 100.

In FIG. 5, a second embodiment of a waterfowl decoy 200 is presented. In this second embodiment, waterfowl decoy 200 has a similarly-shaped body 210 that has an appearance that mimics a waterfowl, as described above. Also similar to the first embodiment, body 210 is molded from plastic and/or filled with a buoyant material, such as foam. Body 210 includes a similar cutout path from its back and neck base 216 to its chest, as indicated by a dotted line in FIG. 5, for insertion of a ball breast 214. Ball breast 214 operates as described above to rotate head 220 toward and from surface 212. Operation of ball breast 214 is undertaken by a user pulling a string 228, as described above. Briefly, pressure exerted on string 228 pulls ball breast 214 as string 228 moves through a loop 230 on a bottom weight 232 and rotates ball breast 214 at its attachment point 226. Also similar to above, a posterior region 234 filled with a larger amount of foam than that of ball breast 214 allows head 220 and ball breast 214 to become submerged below surface 212 before posterior region 234, mimicking the diving motion of a live waterfowl.

Waterfowl decoy 200 may have rotation that is determined or limited by a breast counterweight, as described above, or by a spring 224, as depicted in FIG. 5. In instances were spring 224 is utilized, it may have any length, diameter, material, number of coils, or spring constant capable of permitting at least some rotation of ball breast 214 when pressure is applied to string 228. As pressure is applied to string 228, ball breast 214 rotates toward surface 212 and spring 224 is stretched. The force with which spring 224 pulls back against the rotation limits the amount of rotation of ball breast 214, as spring 224 may not be stretched beyond its elastic limit. A stop lever can also be applied to ball breast 214 at spring attachment to limit spring motion in embodiments not depicted.

Referring again to FIG. 5, waterfowl decoy 200 includes passages for water and air to fill or leave head 220 as it enters or emerges from water under surface 212. Beak passages 236 are located on the underside of the beak of head 220, and head passage 238 is located atop head 220. However, other positions of passages are compatible with the present disclosure. When head 220 is above surface 212 of a body of water, air fills head passage 238 and beak passages 236. When head 220 is rotated beneath surface 212 and underwater, as described above, water enters beak passages 236, while air leaves head passage 238. Further, a ball breast passage 240 extends through and between head 220 and a lower region of ball breast 214 when ball breast 214 is in a resting, non-rotated position. Ball breast passage 240 serves as a drainage path for water when head 220 emerges from a body of water. Thus, when head 220 rotates from a secondary feeding position to either an initial feeding position or a resting position, or positions therebetween, water drains through beak passages 236 and ball breast passage 240 to leave head 220 as air enters head passage 238.

Controlling the rate of draining serves to adjust the timing of head 220 emerging from the body of water. When water drains faster and with a higher flow rate, head 220 returns more quickly to an upright position than when water drains slower and with a lower flow rate. The speed of draining is at least partially controlled by the number and effective diameter of the holes that drain water. For waterfowl decoy 200, a head base 242 serves as a connection point between drainage pathways in head 220 and ball breast passage 240. A user is capable of aligning a hole or holes in head 220 with a corresponding hole or holes making up ball breast passage 240 at head base 242. The amount of diameter alignment of the one or more holes determines how quickly water drains through ball breast passage 240. When there is full overlap between hole diameters, water drains most quickly. Conversely, when there is little overlap, water from head 220 drains more slowly through breast passage 240. Any amount of hole alignment, either total alignment, no alignment, or partial alignment, is possible according to the timing desires of a user. Water drainage adjustments result in timing of head emerging alterations of up to one or more seconds. The number of holes making up head drainage passageways or ball breast passage 240 is one or greater than one, such as 2, 3, or 4 holes. Each hole has a diameter of ⅜ inch in one embodiment, though other diameters are compatible with the present disclosure.

Figure 6:
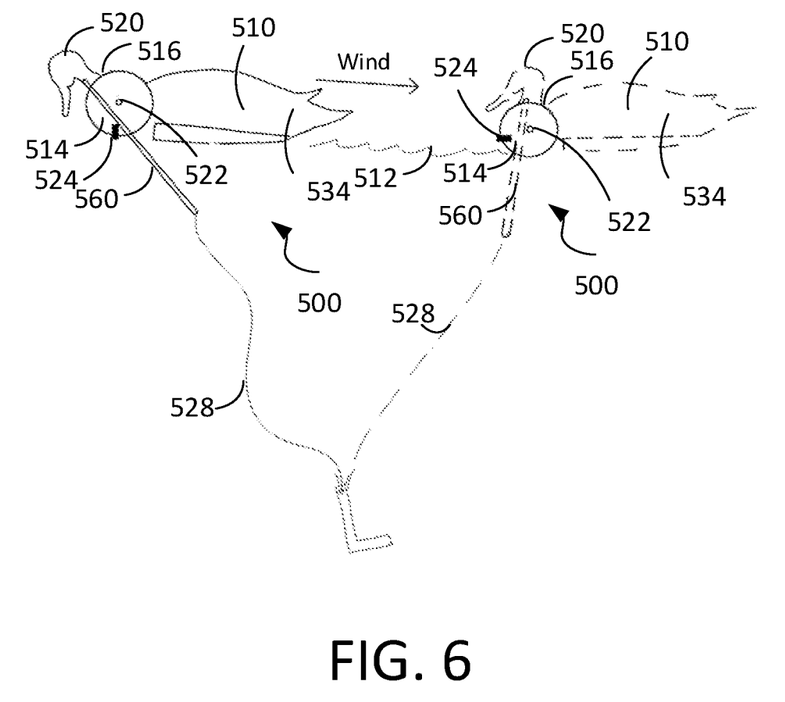
FIG. 6 depicts a side view of an embodiment of the waterfowl decoy of FIG. 1 with features for wind-powered motion.

Referring to FIG. 6, a third embodiment of the present disclosure is presented, with waterfowl decoy 500 having motion provided by wind. In a similar manner to embodiments described above, waterfowl decoy 500 has a body 510 that has an appearance that mimics a waterfowl. Body 510 includes a similar cutout path from its neck base 516 to its chest for insertion of a ball breast 514. Ball breast 514 rotates head 520 toward and from surface 512 as described in greater detail below. Similar to above, a posterior region 534 filled with a larger amount of buoyant material than that of ball breast 514 allows head 520 and ball breast 514 to become submerged below surface 512 before posterior region 534, mimicking the diving motion of a live waterfowl. Ball breast 514 has a horizontal pivot point 522 that is located in a mid-section of the breast of waterfowl body 510. Pivot point 522 extend through a center point of ball breast 514 and serves as a point of pivot or rotation of ball breast 514 and, consequently, head 520.

Waterfowl decoy further includes a rod 560 that spans and extends through ball breast 514. Rod 560 is of variable length, such that both ends extend through ball breast 514. Rod 560 is, in some embodiments, a fiberglass rod, though other materials are compatible with the present disclosure. Rod 560 extends to head 520 at one end and is attached to tether 528 at a second end. In this embodiment, body 510 rests in an initial feeding position, with head 520 directed toward surface 512. For example, see the solid lined body 510 in FIG. 6. Head 520 is weighted to provide the downward resting position. When no wind or light wind is present, head 520 is positioned slightly forward, toward surface 512. When more wind or heavy wind is present, a wind gust temporarily pushes head 520 to an upright or looking position, indicated by dashed lines in FIG. 6. Thus, rod 560 also moves to a more vertical position, which creates tension on tether 528. As tether 528 becomes taut, ball breast 514 rotates and head 520 is in an upright position. The weight of breast counterweight 524 counteracts the rotation of head 520 upward, and when wind lessens or ceases, breast counterweight 524 and rod 560 resume their feedings positions, with head 520 again directed toward surface 512. To adjust for wind strength, a user may adjust rod length or the weight of breast counterweight 524. For example, in stronger wind conditions, greater weights of breast counterweight 524 are required to pivot head 520 than would be necessary in low wind conditions.

Figure 7:
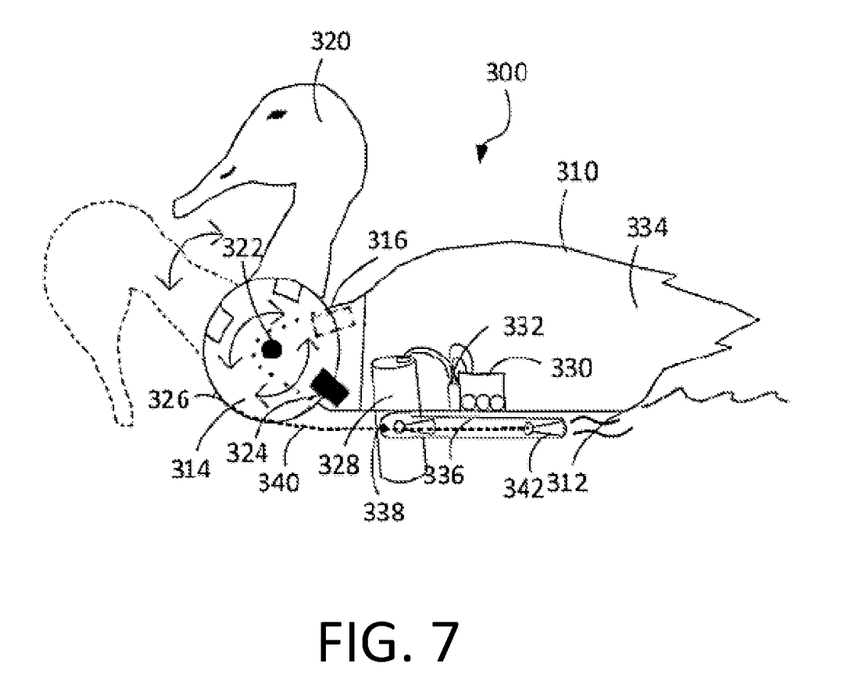
FIG. 7 is a side view of a battery-powered embodiment of the motion waterfowl decoy of the present disclosure, where rotating ball breast motion is accomplished using a battery-powered bilge pump.

Referring now to FIG. 7, a fourth embodiment of the present disclosure with waterfowl decoy 300 is presented. In this third embodiment, waterfowl decoy 300 has a similarly-shaped body 310 that has an appearance that mimics a waterfowl, as described above. Also similar to the first embodiment, body 310 is molded from or filled with a buoyant material, such as foam. Body 310 includes a similar cutout path from its neck base 316 to its chest for insertion of a ball breast 314. Ball breast 314 rotates head 320 toward and from surface 312 as described in greater detail below. Similar to above, a posterior region 334 filled with a larger amount of buoyant material than that of ball breast 314 allows head 320 and ball breast 314 to become submerged below surface 312 before posterior region 334, mimicking the diving motion of a live waterfowl.

The fourth embodiment depicted in FIG. 7 differs from the first, second, and third embodiments in that its motion is operated using a battery-powered bilge pump 328 rather than a user applying pressure to a string or cord. In some instances, bilge pump is powered by a 12-volt battery 330, though other batteries are compatible with the present disclosure such that they provide sufficient power to operate bilge pump 328. One or more batteries 330 may power bilge pump 328, with battery or batteries 330 located in a lower interior region of body 310. Battery 330 is contained within a waterproof housing when waterfowl decoy 300 is configured to be operated on a surface 312 of water. Battery 330 is optionally housed with a timer 332 that determines the frequency of motion by driving bilge pump 328 at for predetermined durations and at predetermined frequencies.

Bilge pump 328 is modified with a hole 338 in approximately a vertical center point of a 90-degree elbow of the pump discharge system 336. A cable 340 is configured to extend between ball breast 314 and a piston 342 of bilge pump 328 by spanning hole 338. Thus, one end of cable 340 is attached to ball breast 314 at a ball breast attachment point 326, similarly to the attachment of the string of the first embodiment 100. However, cable 340 passes through hole 338 and is attached to piston 342 at the second end of cable 340. Cable 340 may be any string, cord, wire, or other tether configured to connect ball breast 314 and piston 342. The length of cable 340 is such that, when attached to attachment point 326 and piston 342, cable 340 allows piston 342 to move within discharge system 336 and not exit. Similarly, the length of cable 340 is such that, when attached to attachment point 326 and piston 342, ball breast 314 is capable of rotating approximately 90 degrees with piston 342 remaining engaged within discharge system 336.

Similar to above, ball breast 314 includes a breast counterweight 324 that at least partially limits the amount of rotation of ball breast 314, and consequently, head 320. In the illustrated embodiment in FIG. 7, breast counterweight 324 moves from an initial resting position that is fully shaded to a rotated position that is outlined in a dashed line to decoy's back or neck base 316. This movement corresponds to the movement of head 320 from an upright position marked with a solid line to a feeding position marked with a dashed line. Rotation of ball breast 314 is about a horizontal pivot point 322, which is located horizontally through approximately a center point of ball breast 314, as described above in earlier embodiments.

Waterfowl decoy 300 has a motion similar to a live waterfowl feeding or drinking from a surface 312. The motion occurs when battery 330 drives bilge pump 328 according to timer 332. Timer 332 operates the motion at intervals ranging from a fraction of a second to a few minutes. The duration of each motion ranges from a fraction of a second to a few minutes. However, other durations and frequencies are compatible with the present disclosure. Intervals and durations may be of a fixed value or of varying values, which may be randomized. The speed of rotation is determined by the movement of piston 342. When bilge pump 328 is powered, piston 342 is configured to travel within the approximately 3" to 6" length of discharge system 336. Other lengths of discharge system 336 pipe are compatible with the present disclosure. Water pushes piston 342 to an exit end of discharge system 336, which puts pressure on cable 340 and pulls attachment point 326. This pulling in turn rotates ball breast 314 forward, toward surface 312. Head 320 moves toward surface 312 as well, such that waterfowl decoy 300 appears to be feeding or drinking. When timer 332 turns off, breast counterweight 324 relocates back to its initial resting position, rotating ball breast 314 and pulling piston 342 back to the front end of discharge system 336. Thus, head 320 returns to its upright position. Battery 330 may be rechargeable, solar powered, or a primary battery. Bilge pump 328 is connected to battery 330 as is known in the art and is commercially available without modifications.

Figure 8:
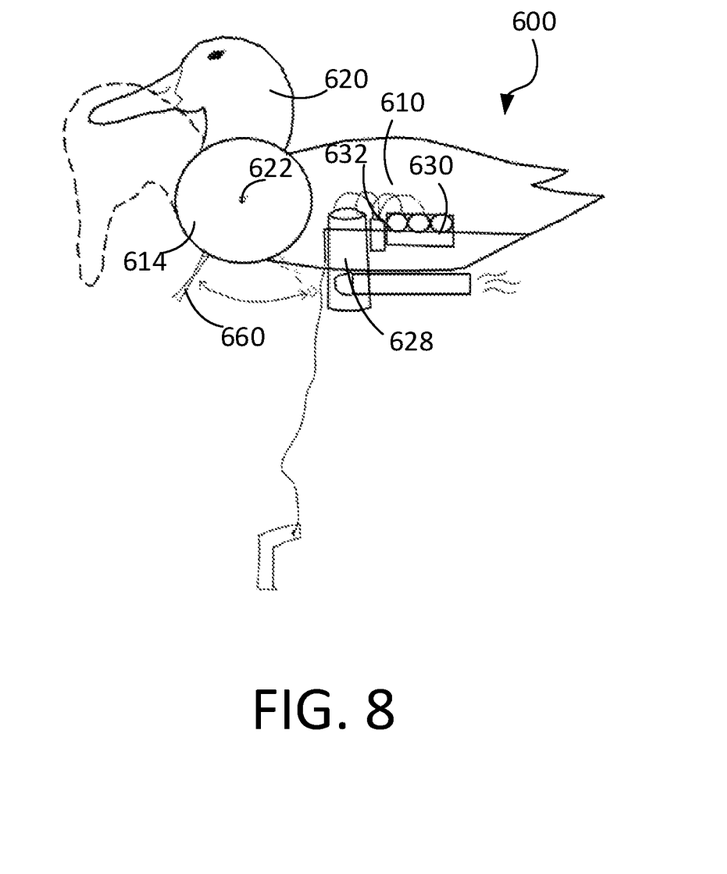
FIG. 8 a side view of the battery-powered embodiment of FIG. 7, further including a blade for rotating the decoy head.

In FIG. 8, a fifth embodiment of a waterfowl decoy 600 is presented, where a blade 660 is used, in combination with a bilge pump 628, to provide motion to the ball breast 614 and head 620. Similar to FIG. 7, waterfowl decoy 600 of FIG. 8 has a bilge pump 628 that is powered by a 12-volt battery 630. Battery 630 is contained within a waterproof housing when waterfowl decoy 600 is configured to be operated on a surface of water. Battery 630 is optionally housed with a timer 632 that determines the frequency of motion by driving bilge pump 628 at for predetermined durations and at predetermined frequencies.

When battery 630 provides power to bilge pump 628, forward movement of decoy 600 creates pressure on an anterior side of blade 660, which is attached to ball breast 614. This pressure warps blade 660 and the water pushes against blade 660, causing it to move toward bilge pump 620 and thus rotate ball breast 614 forward and down into a feeding position. Rotation of ball breast 614 is about a horizontal pivot point 622, which is located horizontally through approximately a center point of ball breast 614, as described above in earlier embodiments. The rotation in turn causes head 520 to rotate toward the surface of the water. When blade reaches bilge pump 628 or another barrier of body 610, rotation ceases. Further, cessation of power to bilge pump 628 will lessen and/or cease the pressure on blade 660, stopping rotation of ball breast 614 and head 620 toward the surface. Opposite directional pressure on blade 660 may then return ball breast 614 and head 620 to their resting positions. This opposite pressure may come from water flow, movement of decoy 600 in the water, or rotation of a breast counterweight (not shown) to its resting position, as is described for embodiments above.

Figure 9:
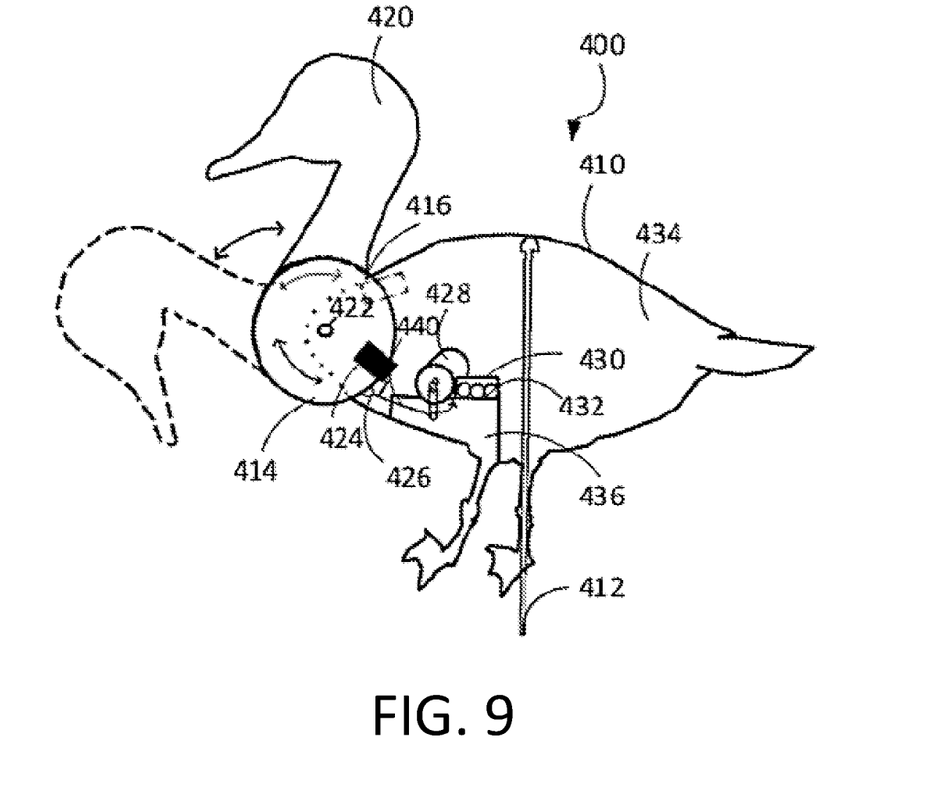
FIG. 9 is a side view of a battery-powered embodiment of the motion waterfowl decoy of the present disclosure, where rotating ball breast motion is accomplished using a battery-powered motor.

Referring now to FIG. 9, a sixth embodiment of the present disclosure with waterfowl decoy 400 is presented. In this sixth embodiment, waterfowl decoy 400 has a similarly-shaped body 410 that has an appearance that mimics a waterfowl, as described above. Also similar to the first embodiment, body 410 is molded from or filled with a buoyant material, such as foam. Body 410 includes a similar cutout path from its neck base 416 to its chest for insertion of a ball breast 414. Ball breast 414 rotates head 420 toward and from surface 412 as described in greater detail below. Similar to above, a posterior region 434 filled with foam and having larger area than that of ball breast 414 allows head 420 and ball breast 414 to become submerged below surface 412 before posterior region 434, mimicking the diving motion of a live waterfowl.

The sixth embodiment depicted in FIG. 9 differs from the first, second, and third embodiments in that its motion is operated using a battery-powered motor 428 rather than a user applying pressure to a string or cord. This motor 428 also operates in place of the bilge pump of the fourth and fifth embodiments. Motor 428 is a 12-volt gear motor in some embodiments, though other motors known in the art are compatible with the present disclosure. In some instances, motor 428 is powered by a 12-volt battery 430, though other batteries are compatible with the present disclosure such that they provide sufficient power to operate motor 428. One or more batteries 430 may power motor 428, with battery or batteries 430 located in a lower interior region of body 410. Battery 430 is contained within a waterproof housing when waterfowl decoy 400 is configured to be operated on a surface 412 of water. In other instances, battery 430 is housed on a platform 436 in a central, lower region of waterfowl decoy 400. Battery 430 is optionally housed with a timer 432 that determines the frequency of motion by driving motor 428 at for predetermined durations and at predetermined frequencies.

A cable 440 is configured to extend between ball breast 414 and a motor 428. Thus, one end of cable 440 is attached to ball breast 414 at a ball breast attachment point 426, similarly to the attachment of the string of the first embodiment 100. However, cable 440 is attached to motor 428 at the second end of cable 440. Cable 440 may be any string, cord, wire, or other tether configured to connect ball breast 414 and motor 428. The length of cable 440 is such that, when attached to attachment point 426 and motor 428, cable 440 allows ball breast 414 to rotate approximately 90 degrees.

Similar to above, ball breast 414 includes a breast counterweight 424 that at least partially limits the amount of rotation of ball breast 414, and consequently, head 420. In the illustrated embodiment in FIG. 9, breast counterweight 424 moves from an initial resting position to a rotated position. This movement corresponds to the movement of head 420 from an upright position to a feeding position. Rotation of ball breast 414 is about a horizontal pivot point 422, which is located horizontally through approximately a center point of ball breast 414, as described above in earlier embodiments.

Waterfowl decoy 400 has a motion similar to a live waterfowl feeding or drinking from a surface 412. The motion occurs when battery 430 drives motor 428 according to timer 432. Timer 432 operates the motion at intervals ranging from a fraction of a second to a few minutes. The duration of each motion ranges from a fraction of a second to a few minutes. However, other durations and frequencies are compatible with the present disclosure. Intervals and durations may be of a fixed value or of varying values, which may be randomized. The speed of rotation is determined by the movement of motor 428. When motor 428 is powered, cable 440 pulls attachment point 426, which in turn rotates ball breast 414 forward, toward surface 412. Head 420 moves toward surface 412 as well, such that waterfowl decoy 400 appears to be feeding or drinking. When timer 432 turns off, breast counterweight 424 relocates back to its initial resting position, rotating ball breast 414. Thus, head 420 returns to its upright position. Battery 430 may be rechargeable, solar powered, or a primary battery. Motor 428 is connected to battery 430 as is known in the art and is commercially available. When surface 412 is a solid surface, waterfowl 400 may be attached to surface 412 using a stake or other mounting structure that goes through a hole in the bottom of decoy 400 and an upside down funnel in the top of decoy 400.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

I claim:

1. A motion waterfowl decoy comprising:
   a body comprising a buoyant material for floating on a water surface, the body having a hollowed chest region fitted with a substantially spherical ball breast, the ball breast coupled to a head of the decoy and configured to rotate about an axis extending through the ball breast; and
   a tether having a first end attached to an exterior attachment point of the ball breast and a second end configured to be pulled,
   a breast counterweight located within the ball breast and configured to leave a resting position and rotate when the ball breast rotates,
   wherein when the tether is pulled, the ball breast rotates until the breast counterweight reaches a neck base of the decoy, such that the head rotates forward toward the water surface without a posterior region of the body rotating forward.

2. The motion waterfowl decoy of claim 1, wherein the substantially spherical ball breast is a spherical ball breast.

3. The motion waterfowl decoy of claim 1, wherein the axis extends through a center of the ball breast.

4. The motion waterfowl decoy of claim 1, wherein the axis is a horizontal axis relative to the body.

5. A motion waterfowl decoy comprising:
   a body comprising a buoyant material for floating on a water surface, the body having a hollowed chest region fitted with a substantially spherical ball breast, the ball breast coupled to a head of the decoy and configured to rotate about a horizontal axis extending through the ball breast;
   a tether having a first end attached to an exterior attachment point of the ball breast and a second end configured to be pulled; and
   a breast counterweight located within the ball breast and configured to leave a resting position and rotate when the ball breast rotates,
   wherein when the tether is pulled, the ball breast rotates until the breast counterweight reaches a neck base of the decoy, such that the head rotates forward toward the water surface without a posterior region of the body rotating forward.

6. The motion waterfowl decoy of claim 5, wherein the substantially spherical ball breast is a spherical ball breast.

7. A motion waterfowl decoy comprising:
   a body comprising a buoyant material for floating on a water surface, the body having a hollowed chest region fitted with a substantially spherical ball breast, the ball breast coupled to a head of the decoy and configured to rotate about a horizontal axis extending through a center of the ball breast;
   a tether having a first end attached to an exterior attachment point of the ball breast and a second end configured to be pulled by a user, the tether extending from the ball breast, through a bottom weight, and to the user; and
   a breast counterweight located within the ball breast and configured to leave a resting position and rotate when the ball breast rotates,
   wherein when the user pulls the tether, the ball breast rotates until the breast counterweight reaches a neck base of the decoy, such that the head rotates forward toward the water surface without a posterior region of the body rotating forward, and wherein when the user releases pressure on the tether, the breast counterweight moves back towards the resting position, rotating the ball breast such that the head rotates away from the water surface.

8. The motion waterfowl decoy of claim 7, wherein the buoyant material is foam.

9. The motion waterfowl decoy of claim 7, wherein the ball breast is filled with foam.

10. The motion waterfowl decoy of claim 7, wherein when the user pulls the tether after the breast counterweight reaches the neck base of the decoy, the head rotates below the water surface and the posterior region of the body rotates away from the water surface.

11. The motion waterfowl decoy of claim 10, wherein the posterior region of the body is more buoyant than the ball breast.

12. The motion waterfowl decoy of claim 10, further including an extended counterweight both connected to the body and extending vertically beneath a lower portion of the decoy, the extended counterweight configured to remain in a vertical orientation and stabilize the body.

13. The motion waterfowl decoy of claim 12, wherein the head is configured to pivot below the body, and wherein a counterweight pivot point at which the extended counterweight is attached to the body is located behind a center point of the body.

14. The motion waterfowl decoy of claim 7, wherein the head further includes at least one passage configured to collect liquid when the head is submerged below the water surface and drain liquid when the head is above the water surface.

15. The motion waterfowl decoy of claim 14, further including at least one main drainage passage extending from a head base to a lower region of the ball breast, such that liquid collected at the head base is configured to drain through the at least one main drainage passage.

16. The motion waterfowl decoy of claim 15, wherein alignment of the at least one main drainage passage with the at least one passage at the head base alters a flow rate of draining liquid.

17. The motion waterfowl decoy of claim 16, wherein a smaller flow rate results in the head rotating away from the water surface more slowly than a larger flow rate.

18. The motion waterfowl decoy of claim 7, wherein the substantially spherical ball breast is a spherical ball breast.

* * * * *